No. 735,621. PATENTED AUG. 4, 1903.
E. THOMSON.
ELECTROSTATIC MOTOR.
APPLICATION FILED MAR. 25, 1901.
NO MODEL.
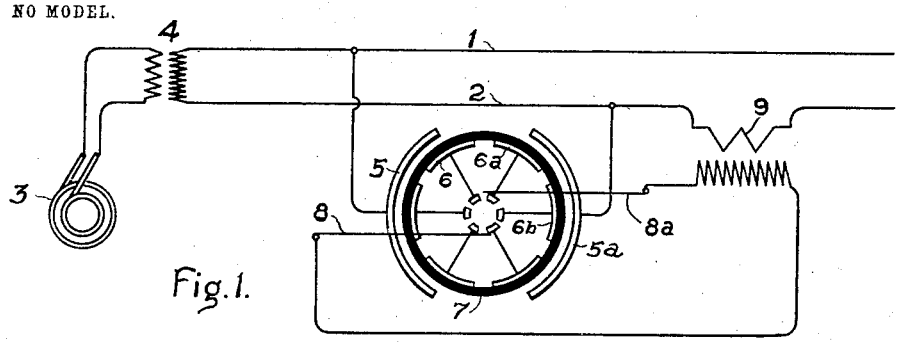
Fig. 1.
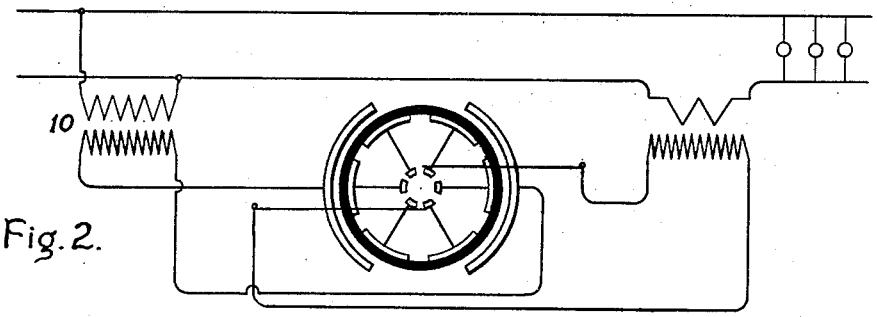
Fig. 2.
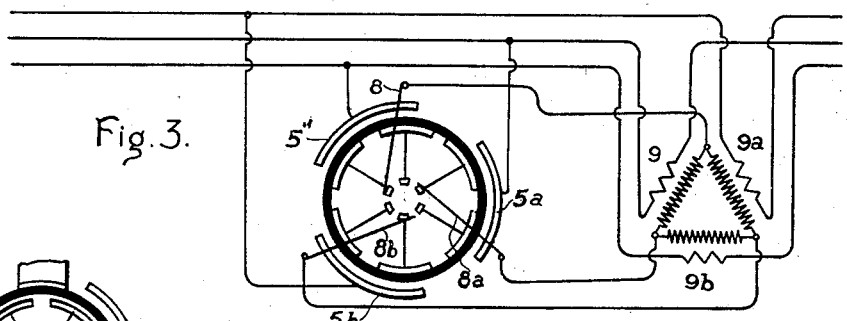
Fig. 3.
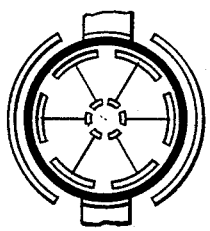
Fig. 4.
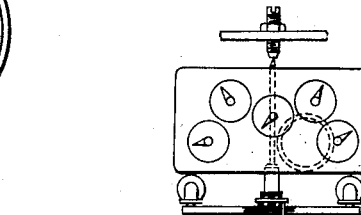
Fig. 5.
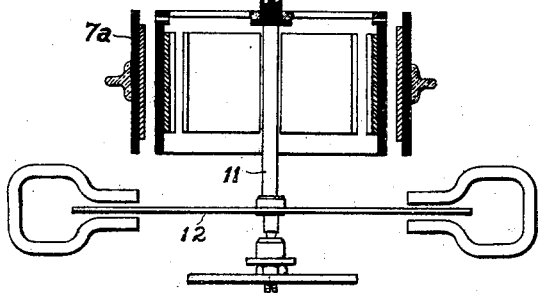
Witnesses.
Ewing Q. Gurney.
B. B. Hull.
Inventor.
Elihu Thomson.
by Albert E. Davis
Atty.

No. 735,621. Patented August 4, 1903.

UNITED STATES PATENT OFFICE.

ELIHU THOMSON, OF SWAMPSCOTT, MASSACHUSETTS, ASSIGNOR TO GENERAL ELECTRIC COMPANY, A CORPORATION OF NEW YORK.

ELECTROSTATIC MOTOR.

SPECIFICATION forming part of Letters Patent No. 735,621, dated August 4, 1903.

Application filed March 25, 1901. Serial No. 52,770. (No model.)

*To all whom it may concern:*

Be it known that I, ELIHU THOMSON, a citizen of the United States, residing at Swampscott, county of Essex, State of Massachusetts, have invented certain new and useful Improvements in Electrostatic Motors, of which the following is a specification.

The object of this invention is to provide a motor for very light work, such as the driving of the recording mechanism of wattmeters, which may be operated under very high voltages and may be very cheap of construction, not involving the wire-winding and core system of the ordinary electromagnetic motors.

In carrying out the invention I produce rotation by means of an electrostatic field composed of two elements, one of which is stationary and the other movable, upon which are imposed high potentials derived from a supply-circuit. This organization being provided with electrostatic surfaces well insulated from one another by an air-gap or other high-insulation dielectric dispenses with all the wire-winding necessary in electromagnetic types of instrument and avoids the dangers of puncture and troubles incident to insulation appertaining to motors operating under currents of very high potential.

In applying a motor of this kind to the operation of recording-wattmeters the field element may derive its potential directly from the mains or through a transformer, if desired, while the armature may be supplied through a small series transformer wound to give a large increase of potential. Thus the two elements of the electrostatic motor correspond to the potential and current coils of the operating-motor of an ordinary indicating-wattmeter, for example, of the Thomson type.

The electrostatic element of the motor which is connected with the potential wires of the work-circuit may have a direct wire connection, imposing on the electrostatic surfaces the potentials of the opposite mains. That element of the motor which responds to the current changes in the work-circuit is charged through a step-up transformer derived from a primary of a few turns in series relation to the work-current. The electrostatic surfaces of the field are preferably fixed in position, and those of the armature are connected with a pair of brushes which bear lightly upon them and connect with the series transformer. Thus the electrostatic attraction and repulsion of the fixed plates with respect to the movable ones develops rotation, and the action of the commutator maintains this rotation continuous so long as the motor is connected in circuit.

My invention therefore comprises an electrostatic motor having two electrostatic fields mounted for relative rotation, one of which is derived from its source through a commutator by which the charge is periodically transferred to successive surfaces as they attain the best working relation to the charged surfaces of the coöperating member. Ordinarily the commutator is mounted on the movable member, which for the sake of convenience of description may be designated as the "armature," and the surfaces of potential charge are progressively transferred in this armature after the fashion of the progression of poles in a Gramme ring, thus developing a continuous torque with relation to the fixed poles of the coöperating member.

The invention involves various features the novelty of which will be hereinafter fully described, and definitely indicated in the claims.

Referring first to Figure 1, 1 and 2 represent a single-phase distribution-circuit of high potential, and 3 an alternating-current source, from which its potential may be derived through a step-up transformer 4. 5 5ª represent one element of a motor constructed according to my invention, comprising metallic plates electrostatically charged by wire connections with the mains 1 and 2, as indicated. As shown, these surfaces are fixed in position, and mounted for rotary movement are a series of metallic plates 6 6ª 6ᵇ, &c., equidistantly spaced and fixed on the interior of an insulating-drum 7. Connecting with the several plates 6 6ª, &c., are segments of a commutator, as indicated, the whole being mounted for rotation within the field 5 5ª. Bearing lightly upon the commutator are flexible brushes 8 8ª. The contact-surfaces of the commutator-plates and the tips of the brushes may be shod with silver to prevent oxidation from arcs. The drum 7 may be made of hard rubber. The diagram represents the motor as connected in circuit in a manner analogous to a recording-wattmeter, the field being charged by a shunt-circuit from the mains and the armature by a series transformer, the primary winding of which embodies a few turns, as indicated at 9, connected in series with the distribution-circuit and the secondary arranged to raise the small potential drop in the line due to these few turns to five hundred volts or upward. This, however, is not essential and is of advantage only where the motor is to indicate by its speed the energy flowing in the circuit. Both the armature and field-plates might be charged directly from the mains so far as the development of torque is concerned.

In Fig. 2 the field-plates are shown also as inductively charged from the line through a potential-transformer 10. Such an arrangement might be employed in connection with a consumption-circuit of comparatively low tension, the armature-voltage being raised to a potential of, say, five hundred volts, and the field to a potential of, say, from six thousand to ten thousand volts. Evidently in the form shown in Fig. 1 the torque of the motor is responsive jointly to the potential of the consumption-circuit and to its load, conditions applicable to the operation of watt-meter-motors. The armature-plates may be mounted on the inside of the drum, as indicated in Figs. 1, 2, and 3, or they may be mounted on metallic arms connected with the commutator-segments and turn upon suitable bearings within the fixed insulating-drum, as indicated in Fig. 4, or in some cases the solid dielectric medium may be omitted entirely and a free air-space left between the two elements. It is evident that in a construction of this character when the circuit is closed on the two elements there will be a rotation of the movable element, provided the brushes bear upon the commutator-segments in an angularly-displaced position with relation to the field-plates. The charge received from one side of the circuit acts repulsively upon one of the armature-plates and attractively upon the other, and after a definite range of movement sufficient to bring under the brushes a new pair of commutator-segments this attractive and repulsive effort is transferred to an adjacent pair of armature-plates, and thus the rotation of the movable element is maintained so long as the circuit remains closed.

In an arrangement such as that shown in Fig. 1 if the source of current be alternating rotation will be maintained notwithstanding a difference of phase of the load-current through the series coil with relation to that in the potential-coil up to a ninety-degree separation, at which the meter will stop. Where the motor is employed to indicate the amount of energy flowing in the circuit, as in a wattmeter, the two elements of the motor should be arranged to produce a strict correspondence of phase with the potentials in the work-circuit which they represent. Since practically little or no current flows into the rotating plates, no compensation for leading or lagging currents will ordinarily be required, and they may be connected directly to the transformer. Where extreme accuracy is desired, a lead in the series transformer may be compensated by shunting its primary by a non-inductive resistance of greater or lesser amount. If, on the other hand, the transformer gives lagging currents, the secondary may be shunted by a small condenser.

In Fig. 3 is shown an arrangement of a motor suitable for polyphase currents. Three field-plates 5 $5^a$ $5^b$ may be employed and three corresponding brushes 8 $8^a$ $8^b$, the former connecting with the several phases of the consumption-circuit or a circuit derived therefrom and the latter with the secondary coils of a triphase transformer, the primary coils of which, 9 $9^a$ $9^b$, are independent of one another and connected in series relation to the several pairs of mains. The secondary coils may be arranged, as indicated, in delta form or may be made in star form and connected with the three brushes. Electrostatic attraction and repulsion follows from this construction, as in that of Figs. 1 and 2, the points of maximum potential shifting from plate to plate in the field and simultaneously from brush to brush which supplies the armature.

In Fig. 5 a motor of the kind described is shown as applied to a Thompson recording-wattmeter, the field-plates being shown as mounted on the inside of an insulating-drum $7^a$ and the armature-plates as carried on a vertical shaft 11, which drives by worm-gearing in the usual manner a registering train of wheelwork, the movements being regulated by a damper 12, consisting of a metal disk revolving in a permanent magnetic field, an expedient well understood by those familiar with the construction of recording-wattmeters.

What I claim as new, and desire to secure by Letters Patent of the United States, is—

1. An electrostatic motor comprising a set of field and armature plates relatively movable, the plates of one element being connected in series relation with a high-potential circuit and those of the other element being symmetrically supported in circular order, and a commutator for leading energy to the latter, said commutator being in shunt relation to said circuit.

2. An electrostatic wattmeter-motor comprising an electrostatic field of force and armature, a commutator for localizing and progressively shifting the charge in the latter and connections in shunt and series relation between these members and a work-circuit.

3. An electrostatic wattmeter-motor comprising an electrostatic field of force, an armature comprising a range of insulated surfaces, means for progressively shifting the charge over said range, and connections for producing a charge on the respective elements proportional to the potential and current of the consumption-circuit.

4. An electrostatic wattmeter-motor comprising two electrostatic fields mounted for relative movement, a commutator for preserving a working torque relation, and connections between the electrostatic surfaces in said fields and the work-circuit to impose potential changes on one set of electrostatic surfaces and current changes on the other.

5. An electrostatic wattmeter-motor comprising two electrostatic fields of force mounted for relative movement, means for progressively shifting the charge in one field of force, connections for changing one field proportionally to the potential of a work-circuit and a step-up transformer having its secondary connected to charge the other field and its primary excited by a few turns of small potential drop in series with the work-current.

6. A polyphase electrostatic motor, comprising a group of field-of-force metal surfaces, a corresponding group of armature-surfaces, and leads for imposing the respective phases on the latter.

In witness whereof I have hereunto set my hand this 21st day of March, 1901.

ELIHU THOMSON.

Witnesses:
DUGALD MCK. MCKILLOP,
W. D. A. RYAN.